W. E. FINKBEINER.
NUT LOCK.
APPLICATION FILED JUNE 2, 1914.
1,161,647.
Patented Nov. 23, 1915.
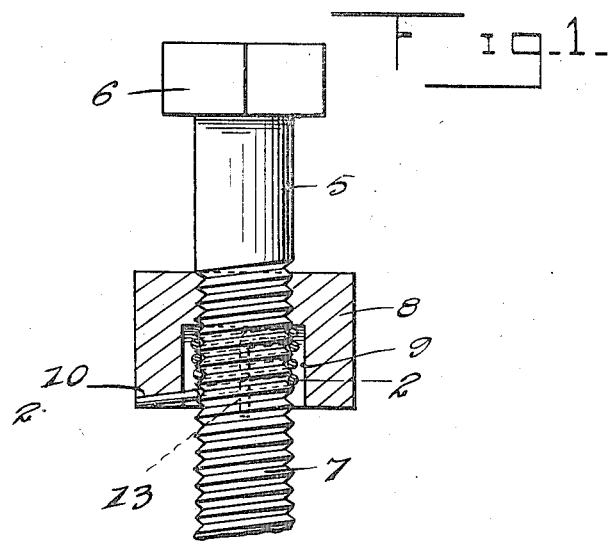
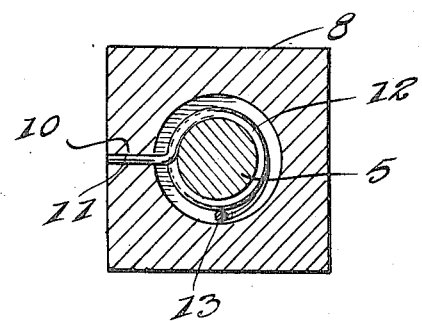
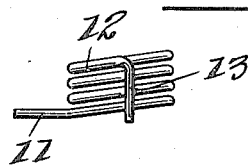
Inventor
W. E. Finkbeiner,
Witnesses

UNITED STATES PATENT OFFICE.

WILLIAM E. FINKBEINER, OF PORT CHESTER, NEW YORK.

NUT-LOCK.

1,161,647. Specification of Letters Patent. Patented Nov. 23, 1915.

Application filed June 2, 1914. Serial No. 842,344.

*To all whom it may concern:*

Be it known that I, WILLIAM E. FINK-BEINER, a citizen of the United States, residing at Port Chester, in the county of Westchester and State of New York, have invented certain new and useful Improvements in Nut-Locks, of which the following is a specification.

This invention relates to nut locks and has for its object to provide a device of this character including a nut having a recess formed concentrically of the bore thereof and receiving a coil spring fitting on the threads of the bolt for preventing the removal of the nut.

Another object is the provision of a nut lock including a spring locking element having its outer end anchored in the nut and its opposite end directed outwardly beyond the outer face of the nut to provide a handle, whereby the coils of the spring locking element may be unwound or expanded to permit removal of the nut from the bolt.

With these and other objects in view, the invention consists in the novel construction, arrangement and formation of parts, as will be hereinafter specifically described, claimed and illustrated in the accompanying drawing, in which:

Figure 1 represents a longitudinal sectional view through a nut lock and bolt. Fig. 2 represents a sectional view through the nut and bolt, indicated on the line 2—2 of Fig. 1. Fig. 3 represents a side elevation of the locking element removed.

Referring to the drawing in detail, wherein similar reference numerals indicate corresponding parts throughout the several views, the numeral 5 indicates a bolt of ordinary construction having a head 6 at one end and screwthreads 7 extending a distance inwardly from the opposite end. A nut 8 is fitted on the threaded end of the bolt 5 and is formed in its upper face with an inwardly directed recess 9 formed concentrically with the threaded bore therethrough and constituting an enlargement of the latter. Adjacent the top or outer face of the nut 8 a recess or opening 10 is formed through one of the walls of the recess 9 and the radially directed end 11 of the locking element 12 is positioned in the recess or opening 10 and thereby anchored in the nut. The locking element 12 is formed from spring wire of adequate thickness coiled a plurality of times as in a coil spring, the coils of which snugly fit the threads 7 of the bolt. The angularly directed end 11 of the locking element 12 is formed at the outer end of the latter, the inner end thereof terminates nearly adjacent to the inner end of the recess 9, as clearly shown in Fig. 1. The inner end 13 of the spring locking element 12 is directed outwardly between the coils and the wall of the recess 9, is disposed parallel with the longitudinal axis of the bolt 5 and terminates a distance beyond the outer face of the nut 8. The exposed portion of the end 13 constitutes a handle which may be conveniently gripped by the fingers or by a suitable tool to unwind or expand the coils of the locking element, whereby the latter may be rotated in either direction upon the bolt. As the nut 8 is rotated to advance upon the threads 7 of the bolt 5 the coils of the locking element 12 tend to expand and therefore offer only slight resistance to the inward movement of the nut, however, when the nut is moved in the opposite direction the coils of the locking element are contracted or drawn tightly around the threads 7, thus frictionally locking the nut against accidental removal. When it is desired to remove the nut the angularly directed end 13 is gripped by the fingers of the operator or a tool and moved so as to expand the coils on the locking element and thus permit the nut 8 to be unscrewed and removed from the bolt 5.

Having thus described the invention what I claim is:

A nut lock comprising a nut having an internally screwthreaded bore and an annular recess formed concentrically with the bore, a coil spring positioned within said recess, said nut having a radial opening communicating with the outer end of said annular recess, the outer end of said coil spring being directed outwardly and anchored in said opening, the opposite end of said spring being disposed parallel with the longitudinal axis of the nut and extended a distance outwardly of the outer face of the latter to provide a handle whereby the coils of the spring may be spread or expanded to permit removal of the nut from a bolt.

In testimony whereof I affix my signature in presence of two witnesses.

WILLIAM E. FINKBEINER.

Witnesses:
 W. C. DAVIS,
 L. M. RADEL.